(12) United States Patent
Hsiao et al.

(10) Patent No.: US 8,068,311 B2
(45) Date of Patent: Nov. 29, 2011

(54) PERPENDICULAR MAGNETIC WRITE HEAD HAVING A NOVEL TRAILING RETURN POLE FOR REDUCED WIDE-AREA-TRACK-ERASURE

(75) Inventors: Wen-Chien David Hsiao, San Jose, CA (US); Yansheng Luo, Fremont, CA (US); Quan-chiu Harry Lam, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 944 days.

(21) Appl. No.: 12/040,717

(22) Filed: Feb. 29, 2008

(65) Prior Publication Data

US 2009/0219649 A1 Sep. 3, 2009

(51) Int. Cl.
*G11B 5/127* (2006.01)
(52) U.S. Cl. .................................................. 360/125.19
(58) Field of Classification Search ............. 360/125.19
See application file for complete search history.

(56) References Cited

U.S. PATENT DOCUMENTS

| 6,122,144 | A | 9/2000 | Chang et al. ............... 360/122 |
| 6,278,591 | B1 | 8/2001 | Chang et al. ............... 360/317 |
| 6,646,828 | B1 | 11/2003 | Sasaki ........................ 360/126 |
| 7,149,055 | B2 * | 12/2006 | Clinton et al. ............. 360/125.3 |
| 7,508,628 | B2 * | 3/2009 | Che et al. ................. 360/125.16 |
| 7,649,711 | B2 * | 1/2010 | Ho et al. .................. 360/125.13 |
| 7,835,111 | B2 * | 11/2010 | Flint et al. ............... 360/125.16 |
| 7,889,458 | B2 * | 2/2011 | Hsiao et al. ............... 360/125.3 |
| 2007/0097546 | A1 | 5/2007 | Li et al. ..................... 360/125 |
| 2007/0211380 | A1 | 9/2007 | Akimoto et al. ............. 360/126 |

FOREIGN PATENT DOCUMENTS

| CN | 1766998 A | 5/2006 |
| CN | 1783216 A | 6/2006 |

* cited by examiner

*Primary Examiner* — Mark Blouin
(74) *Attorney, Agent, or Firm* — Zilka-Kotab, PC

(57) ABSTRACT

A magnetic write head having a magnetic return pole that is configured to prevent wide area track erasure. The magnetic return pole has a throat region with a relatively narrow width and has a inner and outer wing portions formed near the air bearing surface. The inner wing portion has a front edge that is disposed at the air bearing surface, whereas the outer wing portion has a front edge that is recessed from the air bearing surface.

22 Claims, 9 Drawing Sheets

PERPENDICULAR MAGNETIC WRITE HEAD HAVING A NOVEL TRAILING RETURN POLE FOR REDUCED WIDE-AREA-TRACK-ERASURE

FIELD OF THE INVENTION

The present invention relates to perpendicular magnetic recording and more particularly to a magnetic write head having a trailing (or upper) magnetic return pole configured to prevent wide-area-track-erasure.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

SUMMARY OF THE INVENTION

The present invention provides a magnetic write head having a magnetic return pole that is configured to prevent wide area track erasure, especially when stray magnetic field is present. The magnetic return pole has a throat region with a relatively narrow width and has inner and outer wing portions formed near the air bearing surface. The inner wing portion has a front edge that is disposed at the air bearing surface, whereas the outer wing portion has a front edge that is recessed from the air bearing surface.

The front edge of the outer wing portion can form a notch that initiates at the junction between the inner and outer wing portions. The notch can be a tapered notch, or can be a square notch with an edge that is substantially at a right angle with the air bearing surface.

The front edge of the outer wing portion can be substantially parallel with the air bearing surface, or can be tapered, forming an angle of 10 degrees or less with respect to the air bearing surface.

The configuration of the magnetic return pole advantageously prevents magnetic stray fields from causing data erasure, and is particularly useful in preventing data erasure resulting from longitudinal stray fields. The term longitudinal as used herein, refers to a direction that is parallel with a line of symmetry of the write pole, and perpendicular to the air bearing surface. The configuration of the throat region and inner and outer wing structures provides a flux path for magnetic flux produced by such a stray field. The configuration of the inner and outer wing structures advantageously chokes off the magnetic flux slightly, while also avoiding magnetic saturation at the front edge of the pole.

These and other features and advantages of the invention will be apparent upon reading of the following detailed

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
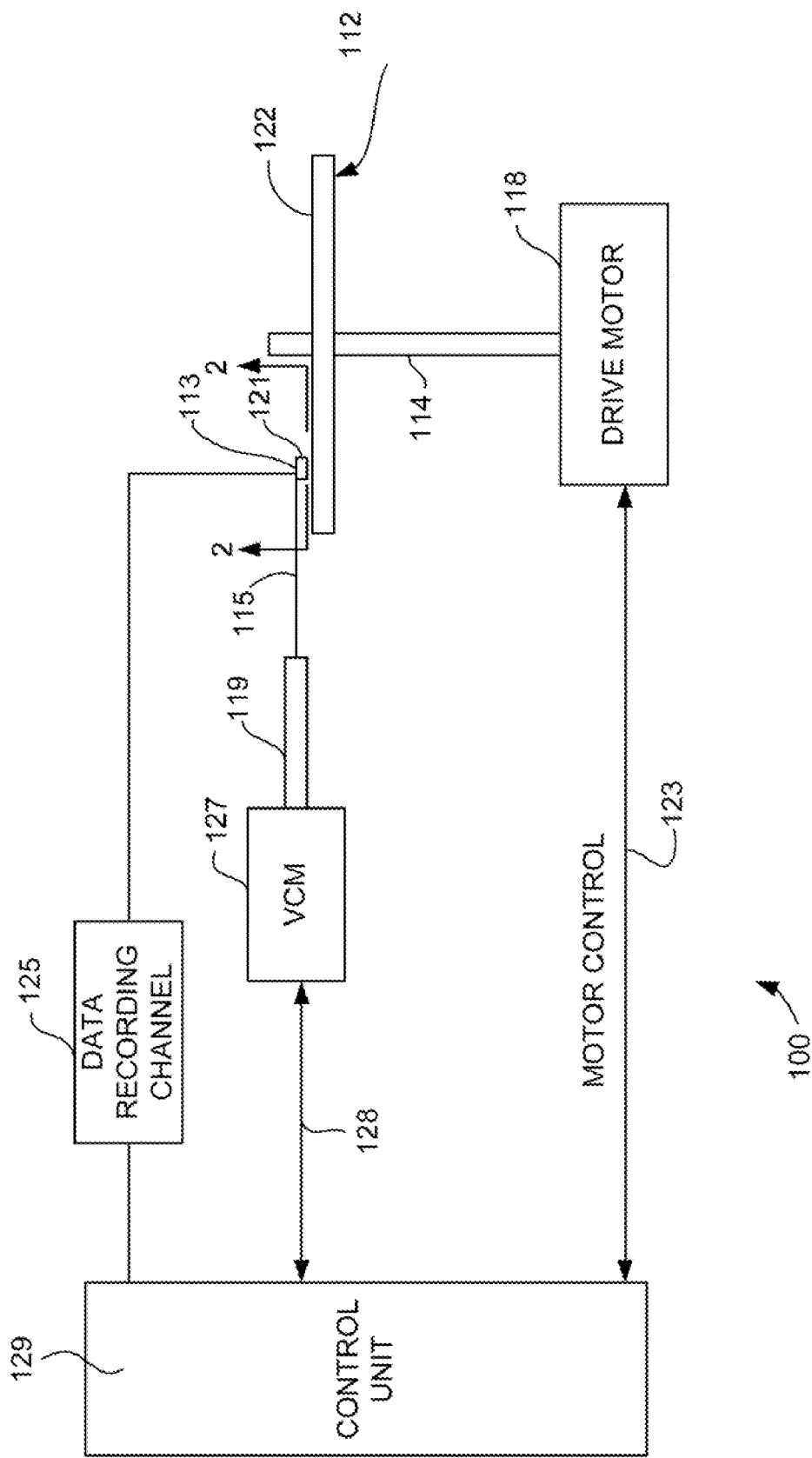
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
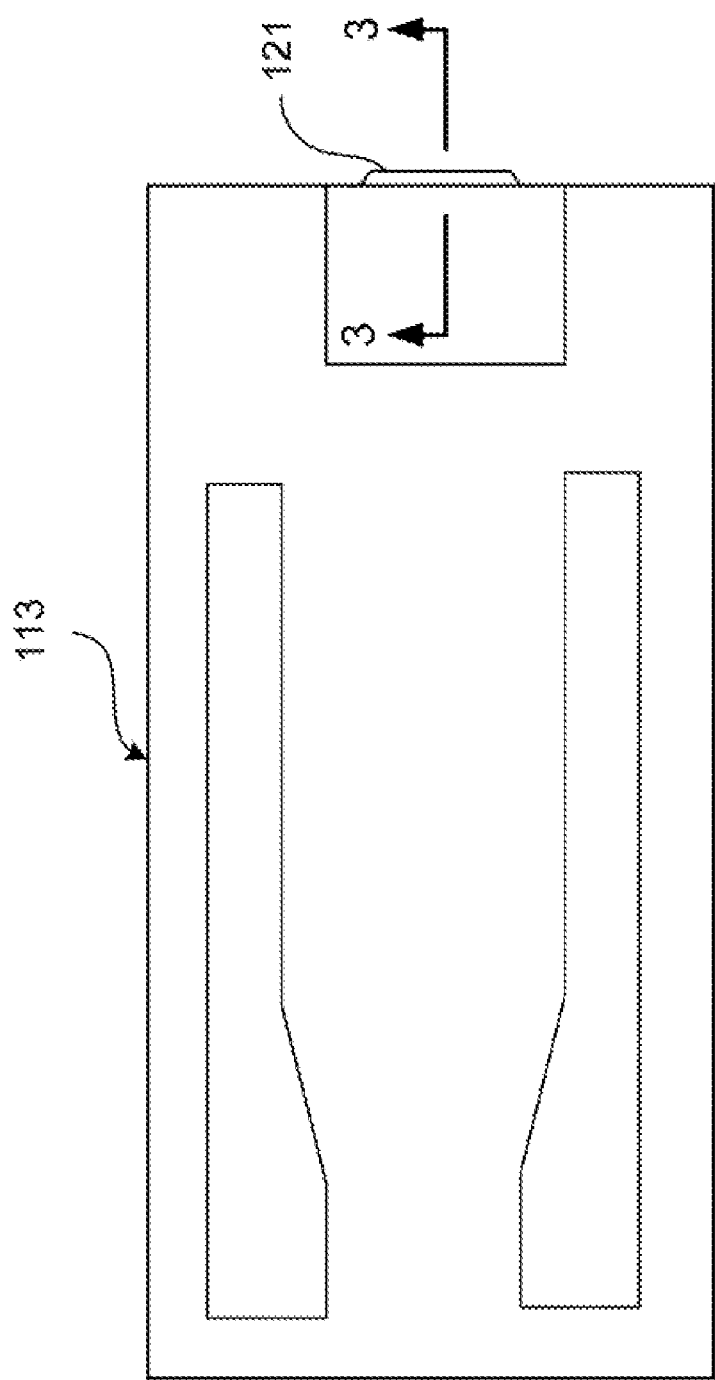
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
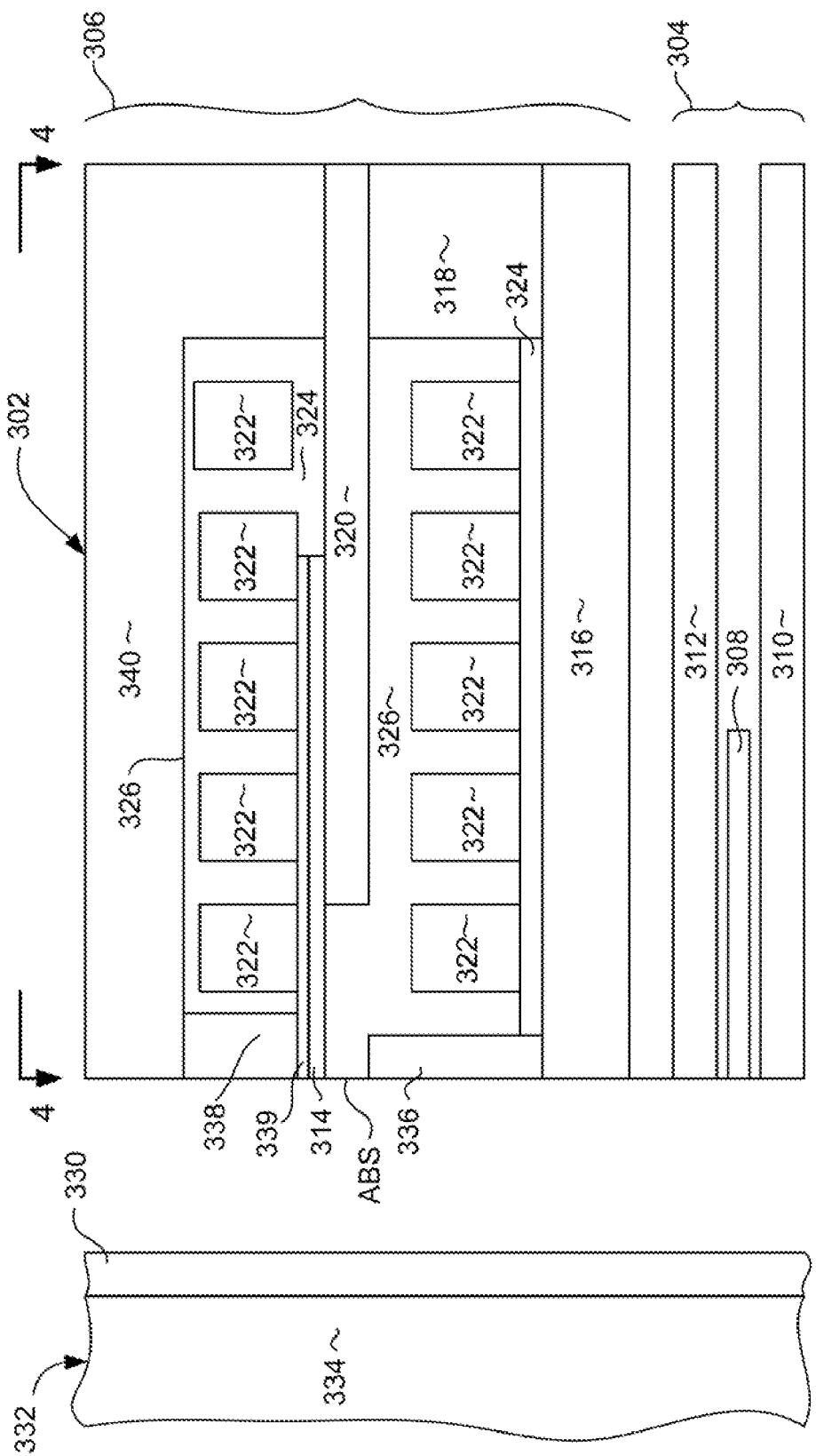
FIG. 3 is a cross sectional view of a magnetic head, taken from line 3-3 of FIG. 2 and rotated 90 degrees counterclockwise, of a magnetic write head according to an embodiment of the present invention.

With reference now to FIG. 3, the invention can be embodied in a magnetic head 302. The magnetic head 302 includes a read head 304 and a write head 306. The read head 304 includes a magnetoresistive sensor 308, which can be a GMR, TMR, or some other type of sensor. The magnetoresistive sensor 308 is located between first and second magnetic shields 310, 312.

The write head 306 includes a magnetic write pole 314 and a magnetic return pole 316. The write pole 314 can be formed upon a magnetic shaping layer 320, and a magnetic back gap layer 318 magnetically connects the write pole 314 and shaping layer 320 with the return pole 316 in a region removed from the air bearing surface (ABS). A write coil 322 (shown in cross section in FIG. 3) passes between the write pole and shaping layer 314, 320 and the return pole 316, and may also pass above the write pole 314 and shaping layer 320. The write coil can be a helical coil or can be one or more pancake coils. The write coil 322 can be formed upon an insulation layer 324 and can be embedded in a coil insulation layer 326 such as alumina and or hard baked photoresist.

In operation, when an electrical current flows through the write coil 322. A resulting magnetic field causes a magnetic flux to flow through the return pole 316, back gap 318, shaping layer 320 and write pole 314. This causes a magnetic write field to be emitted from the tip of the write pole 314 toward a magnetic medium 332. The write pole 314 has a cross section at the ABS that is much smaller than the cross section of the return pole 316 at the ABS. Therefore, the magnetic field emitting from the write pole 314 is sufficiently dense and strong that it can write a data bit to a magnetically hard top layer 330 of the magnetic medium 332. The magnetic flux then flows through a magnetically softer under-layer 334, and returns back to the return pole 316, where it is sufficiently spread out and weak that it does not erase the data bit recorded by the write head 314. A magnetic pedestal 336 may be provided at the air bearing surface ABS and attached to the return pole 316 to prevent tray magnetic fields from the bottom leads of the write coil 322 from affecting the magnetic signal recorded to the medium 332.

In order to increase write field gradient, and therefore increase the speed with which the write head 306 can write data, a trailing, wrap-around magnetic shield 338 can be provided. The trailing, wrap-around magnetic shield 338 is separated from the write pole by a non-magnetic write gap 339, and may be connected with the shaping layer 320 and/or back gap 318 by a trailing return pole 340. The trailing shield 338 attracts the magnetic field from the write pole 314, which slightly cants the angle of the magnetic field emitting from the write pole 314. This canting of the write field increases the speed with which write field polarity can be switched by increasing the field gradient. A trailing magnetic return pole 340 is provided and can be magnetically connected with the trailing shield 338. Therefore, the trailing return pole 340 can magnetically connect the trailing magnetic shield 338 with the back portion of the write pole 302, such with the back end of the shaping layer 320 and with the back gap layer 318. The magnetic trailing shield is also a second return pole so that in addition to magnetic flux being conducted through the medium 332 to the return pole 316, the magnetic flux also flows through the medium 332 to the trailing return pole 340.

Figure 4:
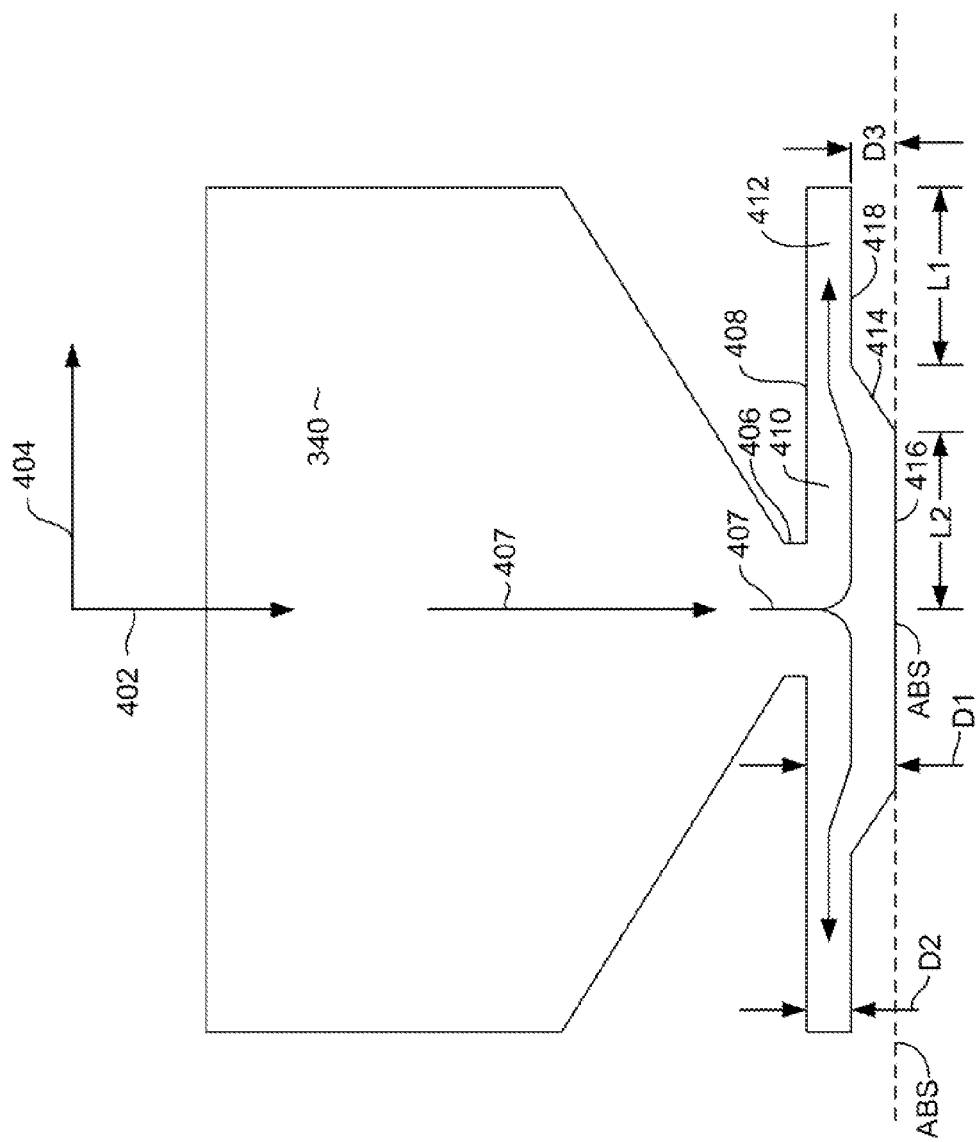
FIG. 4 is a view, taken from line 4-4 of FIG. 3, of a magnetic, trailing return pole of a perpendicular magnetic write head.

With reference to FIG. 4, an embodiment of the trailing return pole 340 is seen as viewed from the trailing direction (or from the top as seen in FIG. 3). One critical problem that can be experienced by perpendicular recording systems relates to stray field erasure, or more specifically, wide area track erasure. Stray fields, which can be from external sources or from the write head itself, can cause magnetic flux to concentrate at certain portions of the return pole and can emit an undesired magnetic field toward the magnetic medium 332 (FIG. 3), resulting in undesired erasure of previously recorded data. Such stray fields can be oriented primarily along a longitudinal direction, indicated by arrow 402, primarily along a transverse direction, as indicate by arrow 404, or can be along some direction between longitudinal and transverse direction. Some computer systems, such as mobile (lap-top) computers, are especially susceptible to longitudinal stray field (i.e. along the direction indicated by arrow 402), because inadvertently applied external stray fields tend to be in a direction perpendicular to the plane of the keyboard. This can occur, for example, by placing a magnetic device onto the computer.

The present invention provides a magnetic return pole 340 that is configured specifically to greatly reduce any track erasure resulting from stray fields. This magnetic return pole is especially useful in preventing longitudinal stray fields from causing unwanted wide area track erasure. As can be seen, the magnetic pole 340 has a throat portion 406, where the width of the pole 340 is significantly reduced. This helps to choke off the magnetic flux 407 resulting from a stray field, such as a longitudinal stray field. The throat section 406 could have a width of 4 μm or greater, depending on the overall size of the structure 340.

The magnetic pole 340 also has a wing structure 408 that has an inner wing portion 410 and an outer wing portion 412. The wing structure 408 is configured with a notch 414, so that, while the inner wing portion 410 has a front edge 416 that can be located at or near the air bearing surface (ABS), the outer wing portion 412 has a front edge 418 that is stepped back or recessed from the ABS.

Also as can be seen, the inner wing portion 410 has a depth D1 measured from its front edge to its back edge that is greater than the depth D2 of the outer wing portion 412. The front edges 416, 414 of both the inner and outer wing portions 410, 412 can both be substantially parallel with the ABS. The depth D2 can be greater than or equal to 0.25 μm, although this dimension can vary depending on factors such as photolithographic process limitations, mechanical strength factors, etc.

The shape of the pole structure 340 includes several features that work together to prevent stray field induced wide area track erasure. As mentioned above, the throat 406 helps to choke of stray field induced flux 407 before it reached the region near the ABS. In addition, the wing portion 408 as a whole provides a flux path for conducting the magnetic flux from the ABS. As shown, when the magnetic flux 407 reaches the region near the ABS it curves away to the side to be conducted to the wing portion 408. Were it not for the presence of the wing portion 408, the flux 407 would leak straight through the ABS, causing data erasure.

In addition, the presence of the secondary wing portion 412 provides great advantage in preventing stray field induced wide area track erasure. As can be seen, the notch 414 moves the front edge 418 of the outer wing 412 away from the ABS. As shown, this advantageously moves the magnetic flux 407 away from the ABS, where the magnetic flux is much less likely to leak to the ABS or to leak to a nearby magnetic medium 332 (FIG. 3). Another advantage provided by the notch 414 and outer wing 412, is that the flux 407 is choked slightly as it enters the outer wing portion 412. Slightly choking the flux 407 allows the amount of flux to be reduced prior to reaching the end of the outer wing 412, while still allowing a sufficient amount of flux to travel into the outer wing portion 412. If the flux were completely choked off (e.g. if there were no outer wing portion) then the flux would have no where to go and would leak to the medium causing data erasure.

Figure 5:
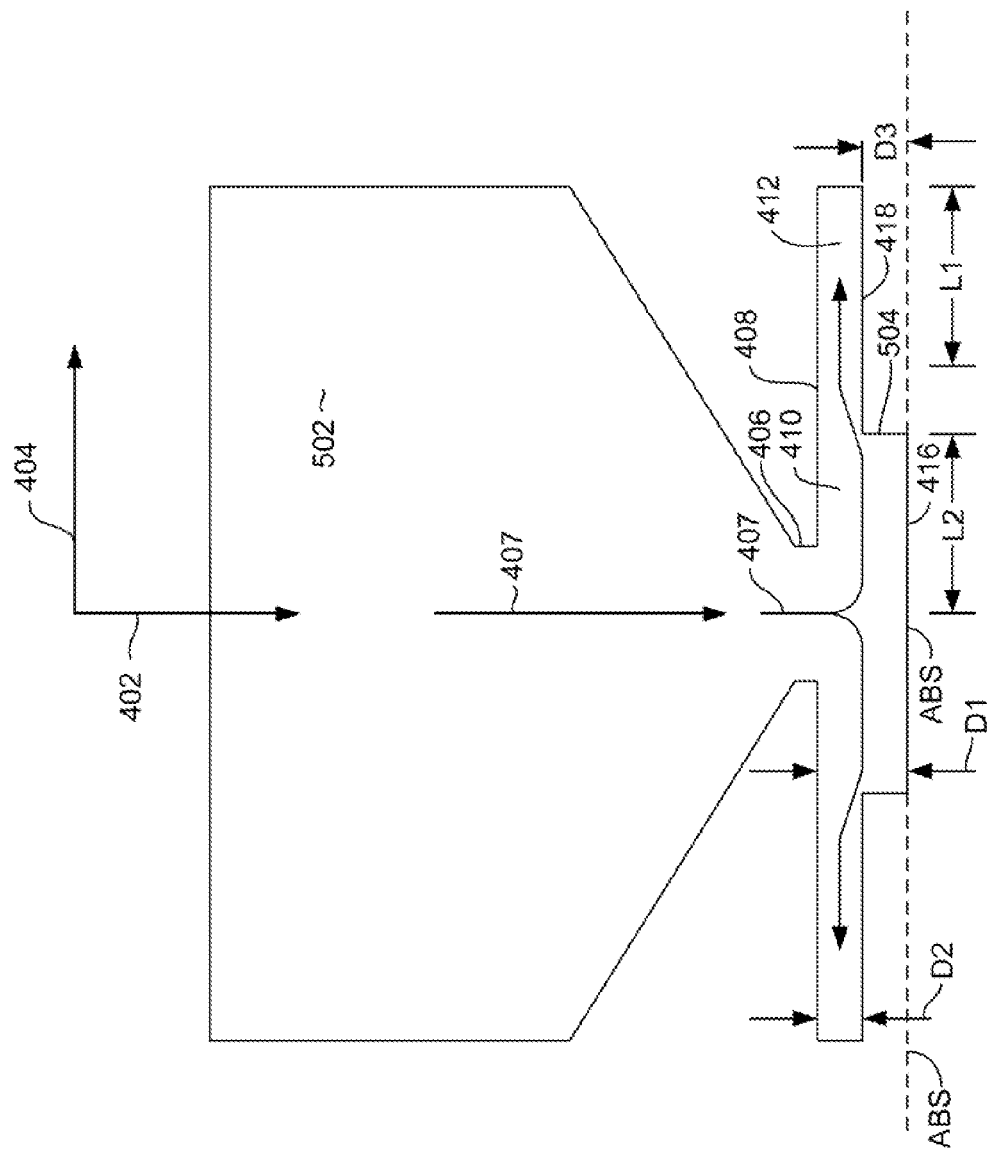
FIG. 5 is a view, similar to that of FIG. 4, of a magnetic, trailing return pole according to an alternate embodiment of the invention.

As shown in FIG. 4, the notch is tapered. The notch 414 preferably has a notch depth D3 of at least 0.1 μm, or more preferably about 0.75 μm as measured from the ABS to the front edge 418 of the outer wing portion 412. The outer wing 412 also preferably has a length L1 of at least 2 μm as measured from the notch 414 to the outer end of the wing portion. Although, the notch 414, is shown as being tapered in FIG. 4, with reference to FIG. 5, a pole 502 can be configured with a notch 504 that is stepped, having a more vertical or abrupt notch shape. In either the embodiment shown in FIG. 4, or the embodiment shown in FIG. 5, the inner wing 410 preferably extends distance L2 of about 5.5 μm as measured from a centerline of the pole 340 to the beginning of the notch 414.

Figure 6:
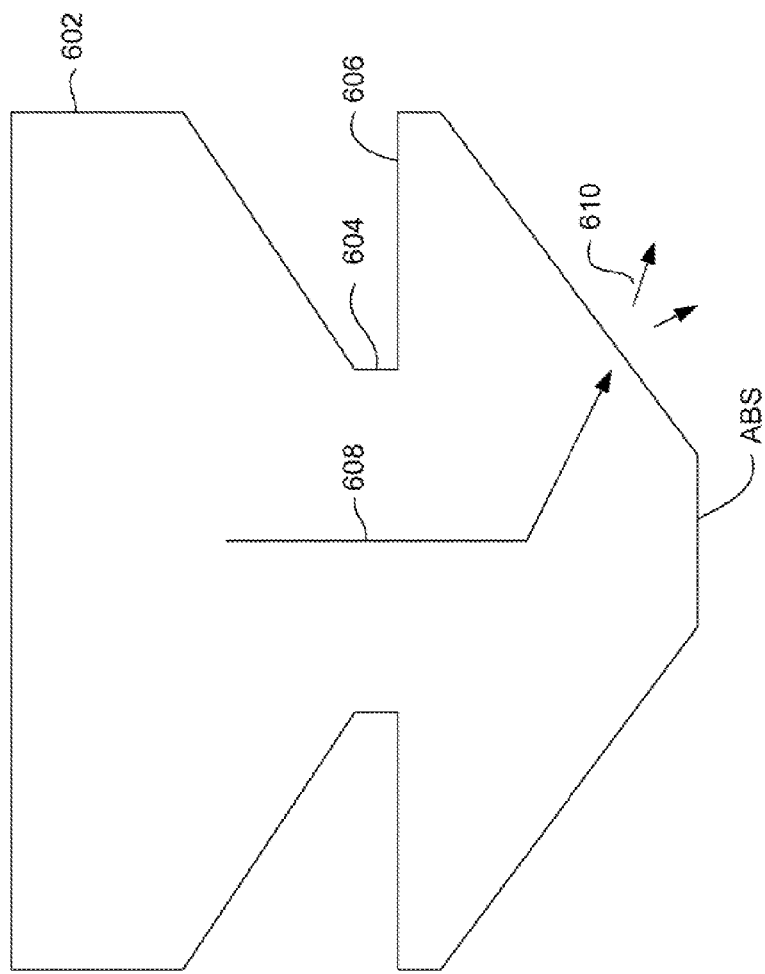
FIG. 6 is a view of a prior art magnetic structure.
Figure 7:
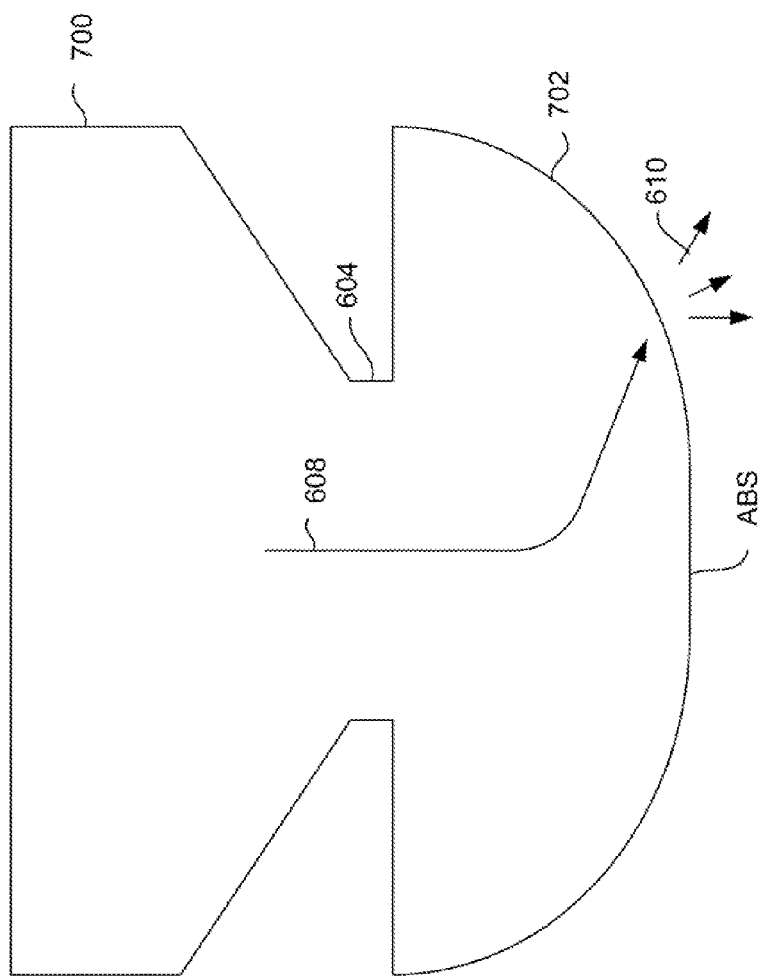
FIG. 7 is a view of another prior art magnetic structure.
Figure 8:
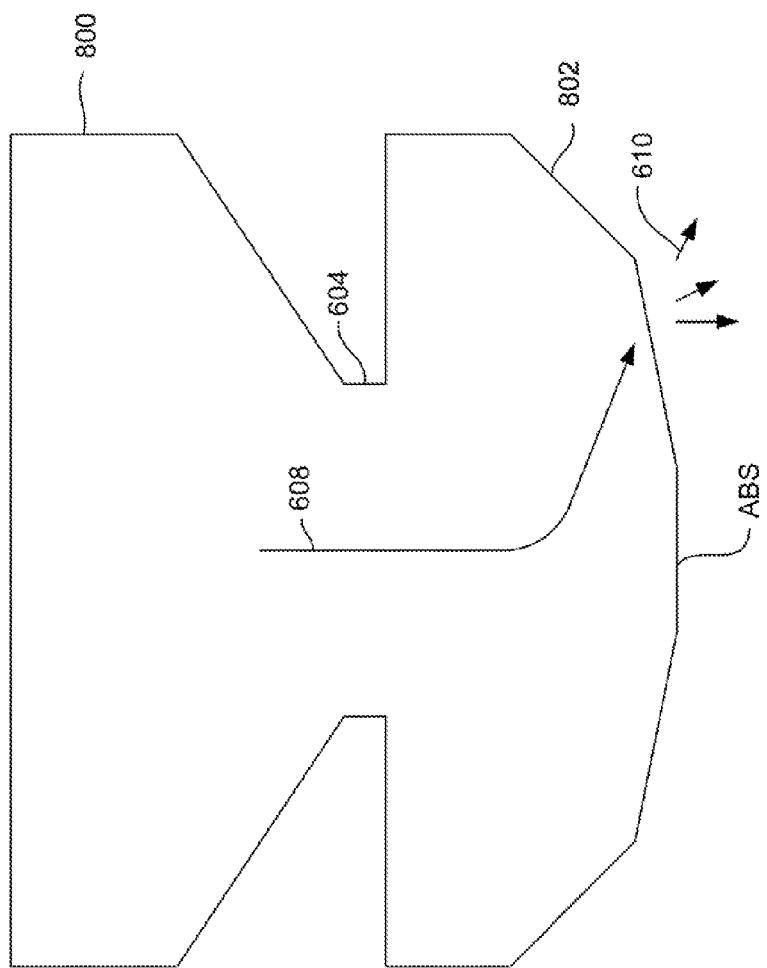
FIG. 8 is a view of a yet another prior art magnetic structure.

The benefit of the notch 414 outer wing portion 412 in preventing wide area track erasure can be understood more clearly with reference to FIGS. 6, 7 and 8, which show examples of prior art magnetic shapes. Magnetic shapes similar to those described in FIGS. 6, 7 and 8 have been described in U.S. Pat. No. 6,122,144 to Chang et al. Chang et al. used such shaped structures in a longitudinal data recording system.

FIG. 6 shows a magnetic structure 602 having a throat section 604 and having a tapered wing portion 606 with a front edge that tapers back. There is no outer wing portion. Modeling has shown that such a structure actually makes wide area track erasure worse (especially as resulting from longitudinal stray fields). This is illustrated in FIG. 6, where a magnetic flux 608 from a longitudinal stray field travels toward the ABS. Because there is no outer wing portion for the flux to divert into, the flux saturates at the front edge of the tapered wing, and leaks magnetic field 610 to the magnetic medium. While the wing 606 could be made larger, providing more material to divert the flux 608 into, the backward taper of the wing 606 and lack of a laterally extending outer wing, would require the magnetic flux to completely reverse direction in order to flow into the outer portion of this wing structure. This, however, does not happen easily, and instead results in magnetic saturation at the front edge of the wing 606 and magnetic field leakage 610, resulting in data erasure.

The other shapes described in FIGS. 7 and 8, exhibit this similar problem. For example, FIG. 7 shows a magnetic structure 700 having a wing 702 with a front edge that curves back from the ABS. FIG. 8 shows a magnetic structure 800 having a wing portion 802 with a front edge the curves away from the ABS as a series of facets with increasing angle away from the ABS. With all of these examples, the lack of a longitudinally extending outer wing, causes magnetic flux leakage and a resulting data erasure.

With reference again to FIGS. 4 and 5, the dimensions L2, D2 and D3 preferably have a relative size such that L2/(D+D3) is at least 2. Also, L2/(one half the width of the throat 406) is preferably at least 1.2.

Figure 9:
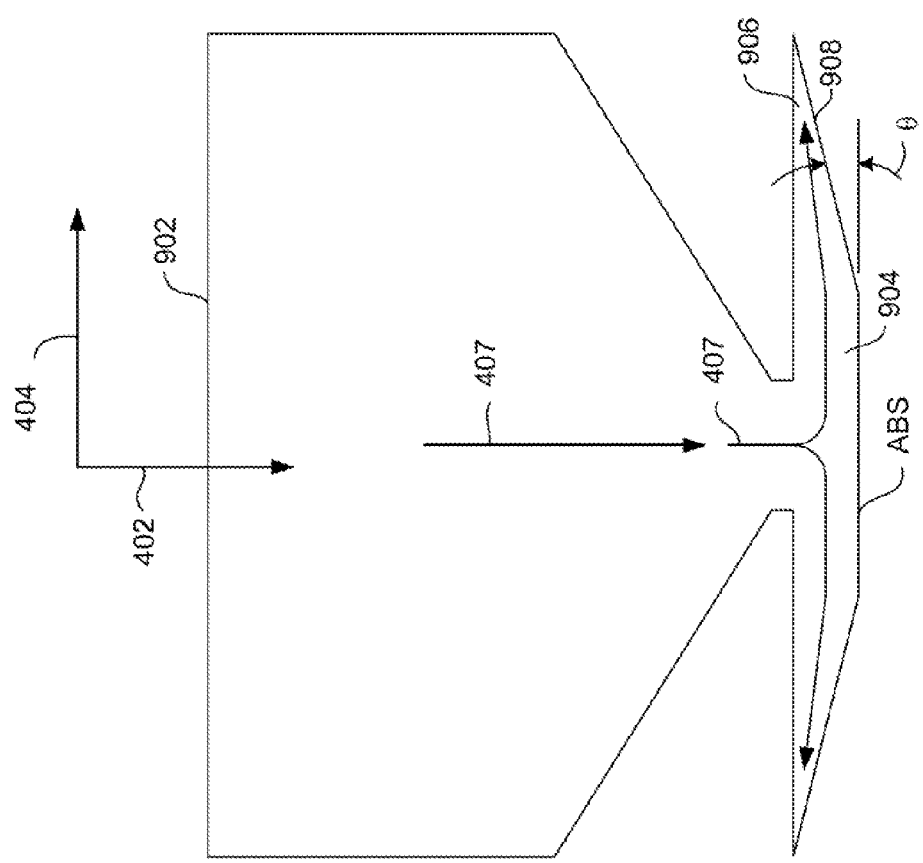
FIG. 9 is a view of a magnetic return pole according to yet another embodiment of the invention.

With reference now to FIG. 9, another possible embodiment of the invention is described. FIG. 9 shows a magnetic pole structure 902, having an inner wing 904, and an outer wing 908. In this embodiment, the outer wing portion 906 has a front edge 908 that tapers away from the ABS at a shallow angle θ. This magnetic pole 902 is fundamentally different from the magnetic structure described above with reference to FIG. 6. The structure 602 of FIG. 6 had a wing 606 that tapered away from the ABS at a relatively large angle, which as described above contributed to wide area track erasure.

The magnetic pole 902 has a gradual, shallow taper. The front edge 908 preferably forms an angle θ with respect to the ABS that is not greater than about 10 degrees. This allows the magnetic flux 407 to be conducted laterally into the wing while being gradually (not abruptly) choked off, thereby preventing leakage to the ABS.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head, comprising:
   a magnetic write pole having an end disposed toward an air bearing surface;
   a magnetic return pole, the magnetic return pole, further comprising:
   a throat region having a relatively narrowed width;
   a wing structure between the air bearing surface and the throat region, the wing structure including an inner wing and an outer wing, the inner wing having a front edge that is at the air bearing surface, and the outer wing having a front edge that is stepped back from the air bearing surface.

2. A write head as in claim 1, wherein the front edge of the outer wing is substantially parallel with the air bearing surface.

3. A write head as in claim 1 wherein the front edge of the outer wing forms an angle not greater than 10 degrees with respect to the air bearing surface.

4. A write head as in claim 1 wherein the front edge of the outer wing forms a tapered notch.

5. A write head as in claim 1 wherein the front edge of the outer wing forms a square notch having an edge that is substantially at a right angle with the air bearing surface.

6. A write head as in claim 1 wherein the front edge is recessed from the air bearing surface by a distance of at least 0.1 μm.

7. A write head as in claim 1 wherein the front edge is recessed from the air bearing surface by a distance of about 0.75 μm.

8. A write head as in claim 1 wherein the outer wing has a length of at least 2 μm.

9. A write head as in claim 1 wherein the magnetic return pole has a longitudinal centerline, and wherein the inner wing extends to a distance of about 5.5 μm from the centerline.

10. A magnetic write head for perpendicular magnetic data recording, comprising:
    a magnetic write pole having an end disposed toward an air bearing surface and having a leading edge and a trailing edge;
    a first magnetic return pole, having an end disposed toward the air bearing surface, the first magnetic return pole being in a leading direction relative to the write pole;
    a trailing magnetic shield, formed at the air bearing surface and separated from leading edge of the write pole by a non-magnetic trailing gap;
    a trailing magnetic return pole having an end disposed toward the air bearing surface and being magnetically connected with the trailing magnetic shield, the trailing magnetic return pole, leading magnetic return pole and write pole begin magnetically connected with one another in a region away from the air bearing surface; and
    a non-magnetic, electrically conductive write coil arranged about the magnetic write pole so as to induce a magnetic flux in the magnetic write pole when a current flows through the write coil;
    the trailing magnetic shield further comprising:
        a throat portion located near, but removed from, the air bearing surface;
        first and second inner wing portions extending laterally outward from the throat portion, and each having a front edge that extends to the air bearing surface; and
        first and second outer wing portions, each extending laterally outward from an end of one of the inner wing portions, each of the inner wing portions having a front edge that is recessed from the air bearing surface.

11. A magnetic write head as in claim 10 wherein the front edge of each of the outer wing portion is substantially parallel with the air bearing surface.

12. A magnetic write head as in claim 1 wherein the front edge of each of the outer wing portions forms an angle of 0 to 10 degrees relative to the air bearing surface.

13. A magnetic write head as in claim 10 wherein the front edge of the outer wing forms a tapered notch.

14. A write head as in claim 10 wherein the front edge of the outer wing forms a square notch having an edge that is substantially at a right angle with the air bearing surface.

15. A write head as in claim 10 wherein the front edge of the outer wing portion is recessed from the air bearing surface by an angle of at least 0.1 μm.

16. A write head as in claim 10 wherein the front edge of the outer wing portion is recessed from the air bearing surface by a distance of about 0.75 μm.

17. A write head as in claim 10 wherein the outer wing has a length of at least 2 μm.

18. A write head as in claim 10 wherein the magnetic return pole has a longitudinal centerline, and wherein the inner wing extends to a distance of about 5.5 μm from the centereline.

19. A magnetic data recording system comprising:
    a housing;
    a magnetic disk mounted within the housing;
    an actuator mounted within the housing;
    a slider connected with the actuator for movement adjacent to a surface of the magnetic medium;

a magnetic write head formed on the slider, the magnetic write head further comprising:

a magnetic write pole having an end disposed toward an air bearing surface;

a magnetic return pole, the magnetic return pole, further comprising:

a throat region having a relatively narrowed width;

a wing structure between the air bearing surface and the throat region, the wing structure including an inner wing and an outer wing, the inner wing having a front edge that is at the air bearing surface, and the outer wing having a front edge that is stepped back from the air bearing surface.

20. A magnetic data recording system as in claim 19 wherein the front edge of the outer wing is substantially parallel with the air bearing surface.

21. A magnetic data recording system as in claim 19 wherein the front edge of the outer wing forms an angle not greater than 10 degrees with respect to the air bearing surface.

22. A magnetic data recording system as in claim 19 further comprising a notch initiating at a junction of the inner and outer wing.

* * * * *